US008813253B2

United States Patent
Ksontini et al.

(10) Patent No.: US 8,813,253 B2
(45) Date of Patent: *Aug. 19, 2014

(54) METHOD FOR THE AUTHENTICATION OF APPLICATIONS

(75) Inventors: Rached Ksontini, Lausanne (CH); Renato Cantini, Belfaux (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,266

(22) Filed: Jul. 25, 2012

(65) Prior Publication Data

US 2012/0314859 A1 Dec. 13, 2012

Related U.S. Application Data

(63) Continuation of application No. 10/577,857, filed as application No. PCT/EP2004/053116 on Nov. 26, 2004, now Pat. No. 8,261,365.

(30) Foreign Application Priority Data

Nov. 27, 2003 (EP) ..................................... 03104412

(51) Int. Cl.
*H04L 29/06* (2006.01)
*H04W 12/08* (2009.01)
*H04W 4/00* (2009.01)
*H04W 12/10* (2009.01)

(52) U.S. Cl.
CPC .............. *H04W 4/003* (2013.01); *H04W 12/08* (2013.01); *H04L 63/0853* (2013.01); *H04L 63/123* (2013.01); *H04W 12/10* (2013.01); *H04L 63/12* (2013.01)
USPC .................. 726/29; 726/2; 380/211; 725/132

(58) Field of Classification Search
None
See application file for complete search history.

(56) References Cited

U.S. PATENT DOCUMENTS 5,809,413 A    9/1998   Meche et al.
6,341,373 B1   1/2002   Shaw
(Continued)

FOREIGN PATENT DOCUMENTS

EP    1492061 A1 * 12/2004   ................ G07F 7/10
FR    2831362           4/2003
(Continued)

OTHER PUBLICATIONS

International Search Report (PCT/ISA/210 and PCT/ISA/220).

*Primary Examiner* — Michael R Vaughan
(74) *Attorney, Agent, or Firm* — Harness, Dickey & Pierce, P.L.C.

(57) ABSTRACT

Authentication method of at least one application using resources stored in a security module associated to an equipment connected to a control server via a network. The control server receives via the network, analyses and verifies identification data comprising at least an identifier of the equipment and an identifier of the security module, generates a cryptogram comprising a digest of the application, the identification data and instructions intended for the security module and transmits the cryptogram, via the network and the equipment, to the security module. The latter verifies the application by comparing the digest extracted from the cryptogram with a calculated digest, wherein, during at least one of initialization and activation of the application, the security module executes the instructions extracted from the cryptogram and either releases or blocks access to certain resources of said security module according to a result of the verification of the application.

8 Claims, 5 Drawing Sheets

(56) References Cited

U.S. PATENT DOCUMENTS

| | | |
|---|---|---|
| 6,513,121 B1 | 1/2003 | Serkowski |
| 6,609,199 B1 | 8/2003 | DeTreville |
| 6,714,778 B2 | 3/2004 | Nykanen et al. |
| 6,775,536 B1 | 8/2004 | Geiger et al. |
| 6,832,230 B1 | 12/2004 | Zilliacus et al. |
| 6,925,560 B1 | 8/2005 | Basquin |
| 7,065,783 B2 | 6/2006 | Rygaard |
| 7,139,915 B2 | 11/2006 | DeTreville |
| 7,440,571 B2 * | 10/2008 | Sasselli et al. ............... 380/264 |
| 8,001,615 B2 | 8/2011 | Ksontini et al. |
| 2001/0051515 A1 | 12/2001 | Rygaard |
| 2002/0012433 A1 | 1/2002 | Haverinen et al. |
| 2002/0062451 A1 | 5/2002 | Scheidt et al. |
| 2002/0169983 A1 | 11/2002 | Rygaard |
| 2003/0114144 A1 | 6/2003 | Minemura |
| 2004/0015694 A1 | 1/2004 | DeTreville |
| 2004/0019790 A1 | 1/2004 | Aono et al. |
| 2004/0102987 A1 | 5/2004 | Takahashi et al. |
| 2004/0107349 A1 * | 6/2004 | Sasselli et al. ............... 713/176 |
| 2004/0172542 A1 | 9/2004 | Minemura |
| 2004/0199787 A1 | 10/2004 | Hans et al. |
| 2004/0250074 A1 | 12/2004 | Kilian-Kehr |
| 2005/0091544 A1 | 4/2005 | Lambert |
| 2005/0097053 A1 | 5/2005 | Aaltonen et al. |
| 2005/0278787 A1 | 12/2005 | Naslund et al. |
| 2006/0224470 A1 | 10/2006 | Garcia Ruano et al. |
| 2006/0236092 A1 | 10/2006 | Hamalainen |
| 2006/0288407 A1 | 12/2006 | Naslund et al. |
| 2007/0256134 A1 | 11/2007 | Lehtonen et al. |

FOREIGN PATENT DOCUMENTS

| | | |
|---|---|---|
| GB | 2387505 | 10/2003 |
| JP | 2001-312402 | 11/2001 |
| JP | 2002-152196 | 5/2002 |

* cited by examiner

METHOD FOR THE AUTHENTICATION OF APPLICATIONS

CROSS-REFERENCE TO RELATED APPLICATIONS

This application is a continuation of and claims priority under 35 U.S.C. §§120/121 to U.S. patent application Ser. No. 10/577,857, filed on Apr. 28, 2006, now U.S. Pat. No. 8,261,365 which is a National Stage of International Application No. PCT/EP2004/053116, filed on Nov. 26, 2004, and which claims the benefit of European Patent Application No. 03104412.6, filed on Nov. 27, 2003. The disclosures of each of the above applications are incorporated herein by reference.

FIELD OF THE INVENTION

This invention relates to the domain of mobile networks also called cellular networks. In particular, it concerns the managing of the security of applications set to work by a security module associated with a mobile equipment of mobile telephony.

TECHNICAL BACKGROUND

The security module of a mobile or portable telephone is known under the designation "SIM card" (Subscriber Identity Module) that constitutes the central security element of these telephones. The telephony operator introduces, during manufacturing and/or during a personalization step, a number called IMSI (International Mobile Subscriber Identification) that serves to identify in a secure and unique way each subscriber desiring to connect to a mobile network. Each mobile phone, hereinafter called mobile equipment, is physically identified by a number stored in a non-volatile memory of the mobile equipment. This number, called IMEI, (International Mobile Equipment Identifier) contains an identification of the type of mobile equipment and a serial number serving to identify in a unique way a given mobile equipment on a network of the type of GSM (Global System for Mobile Communications), GPRS (General Packet Radio System) or UMTS (Universal Mobile Telecommunications System). Moreover, a mobile equipment is characterized by a software version SVN (Software Version Number) indicating the updating state of the software system installed on the mobile equipment. The combination of the identification of the type and serial number of the mobile equipment with the software version (SVN) gives a new identification, called IMEISV (International Mobile Equipment Identifier and Software Version Number). The same identification concept is also applied to WLAN (Wireless LAN) or bi-directional cable TV. The physical identifier can be a MAC (Media Access Control) address that corresponds to the unique address identifying the hardware configuration of a user's equipment on an IP (Internet Protocol) network and the software version can be transmitted by upper layer protocols based on IP.

The ETSI ("European Telecommunications Standards Institute") standards define a mobile station (MS, mobile station) composed of a mobile equipment (ME, mobile equipment) and a subscriber module (SIM, Subscriber Identity Module). This subscriber module is usually removable, that is to say that it can be withdrawn or transferred from one mobile equipment to another.

During the commissioning of a mobile equipment, more particularly at the time of its connection to an operator network, information comprising the identification data is exchanged between the mobile equipment and the management center of the operator that authorizes or prohibits its use. At present, a mobile equipment offers to the user, in addition to its usual function of establishing telephone conversations by means of access to a mobile network, the use of numerous other supplementary value added services such as the consultation of different data, remote banking transactions, electronic trade, accessing multimedia contents, etc. These improved services require an ever-increasing level of security in order to protect users against possible frauds caused by third parties attempting to exploit security failures that may appear on mobile equipment.

A verification becomes thus necessary on at least two levels: on the one hand at the level of the mobile equipment itself and on the other hand at the level of software applications allowing the functioning of the different services proposed by the operator or third parties. These applications are usually downloaded from the server of an application supplier, which involves the necessity of verifying this downloading. It is thus a question of guaranteeing that the subscriber module only provides data to authorized applications once this module has been recognized by the control server as being able to function with the mobile equipment into which it is inserted.

The subscribed module can contain confidential information such as a bank account number or a password. An application working on the mobile equipment will be in charge to use of this personal data in order to supply the awaited service. Nevertheless, an application could divert this personal data for other usage than the dialogue with the concerned application supplier. This could in result an important tort for the owner of the subscriber module.

These applications executed in the mobile equipment use resources available in the subscriber module. Resources are understood to mean different functions and data necessary for the correct function of an application. Certain resources can be common to several applications, in particular the functions linked to security. The subscribed module can in this way block or alter the working of certain applications for which the security conditions established by the operator and/or application suppliers are not respected in the mobile equipment in question or the rights of the user of the mobile equipment are insufficient.

The document FR2831362 describes a secured transaction process between a mobile phone provided with a SIM card and an applications server. The aim of this process is to protect the rights linked to the use of applications downloaded from the server by means of the SIM card.

According to this process, a trusted connection is first established between the server and the SIM card by means of the secured exchange of public keys, then the purchase of an application is carried out through the transmission of a request file by the mobile equipment to the server. The latter partially or entirely encrypts the application and transmits to the mobile equipment a cryptogram formed by the encryption key and a command, the whole encrypted with a public key known by the SIM card. On reception by the mobile equipment, this cryptogram is decrypted and the key is stored in the SIM card. The execution of the command leads to the downloading in the mobile equipment of the application that is partially or entirely encrypted by the server. Once downloaded, the application is decrypted by the key stored in the SIM card and is then installed in the mobile equipment.

According to this process, the using rights of the application in the mobile equipment are protected because of the trusted link initially established between the equipment and the server and preceding the transaction. The role played by the server is focused rather on the rights management or DRM (Digital Rights Management) of the users of an application in a mobile equipment. The solution developed hereinafter is oriented rather towards the management of risks (Risk Management) taken into account by the operator, the application supplier or the user in relation to an application.

SUMMARY OF THE INVENTION

The aim of the present invention is to propose an authentication method of an application(s) in a mobile equipment during downloading as well as during execution. It relates to limiting the risks linked to the fact that a subscriber module may be used unwisely or used by applications that fail to fulfill certain pre-established security criteria.

Another aim is to protect the user of the mobile equipment as well as concerned application suppliers against the misuses resulting from unauthorized use of applications.

These aims are achieved by an authentication method of at least one application functioning in a equipment connected by a network to a control server, said equipment being locally connected to a security module, said application is loaded and/or executed by means of an application execution environment of the equipment and uses resources stored in the security module, comprising the following preliminary steps:
  reception, by the control server, via the network, of data comprising at least the identifier of the equipment and of the identifier of the security module,
  analysis and verification by the control server of said data,
  generation of a cryptogram comprising a digest of the application, data identifying the equipment and the security module and instructions intended for said module,
  transmission of said cryptogram, via the network and the equipment, to the security module,
  verification of the application by comparing the digest extracted from the cryptogram received with the digest determined by the security module,
said method is characterized in that, during the initialization and/or activation of the application, the security module carries out the instructions extracted from the cryptogram and releases, respectively blocks access to certain resources of said security module according to the result of the verification suited to this application carried out previously.

The resources of the security module are blocked or released in a targeted way, with the aim of rendering certain applications usable or unusable. Applications of the mobile equipment are not directly blocked or released: one act in an indirect way on the applications, that is to say the locking or liberation effect will only appear when the mobile equipment attempts to execute these applications.

This method is preferably applied to the mobile network. Consequently, the equipment is, for example, a mobile phone equipment and the security module is a subscriber module or SIM card. This assembly is connected to a mobile network of the type GSM (Global System for Mobile Communications), GPRS (General Packet Radio Service), UMTS (Universal Mobile Telecommunications System) or others, managed by a control server of an operator. Software applications are installed in the mobile equipment and configured in order to use resources (data or functions) present in the subscriber module. Therefore, they can only be used in their entirety only if the security conditions are satisfied according to criteria established by the operator and/or the application supplier. This verification of the criteria is in charge of the control server. The application, following the instructions sent by the control server, is finally taken in charge by the security module, which can release or block the access to the resources necessary for a correct functioning of an application installed in the mobile equipment.

The data of these resources can comprise information such as account numbers, programs (in form of code to be installed in the mobile equipment), encryption/decryption keys, access rights to a content, etc.

The functions of these resources can comprise cryptographic algorithms, verification processes, digital signatures generation processes, encryption processes, authentication processes, data validation processes, access control processes, data saving processes, payment processes etc.

The method according to the invention is based on the fact that to an application is associated a cryptogram that conditions the use of the application on a mobile equipment connected to a network. Unlike the process described in the document FR2831362, the partial or entire encryption of the application, before downloading into the mobile equipment, is not necessary. In fact, according to the method of the invention, the connection between the server and the security module (or subscriber module) serves to control in an optimal way its resources and to decide their implementation or not in relation to the applications carried out in the mobile equipment. The command received from the server, in the process of the cited document, allows controlling the use of the application installed in the mobile equipment, while in the present method, it allows the activation or deactivation of the security module resources.

For example, when the resources are deactivated, the application will function in a "minimal" way leaving the user with a reduced number of possibilities. In an embodiment example, this reduction can pertain to the maximum amount authorized for the purchase of services and furthermore, these services can only be obtained in a given place (shopping center, stadium, train station, airport, etc.)

In a first embodiment, the cryptogram is transmitted to the subscriber module during the loading of the application. In a second embodiment, it is the application that will request the cryptogram on the control server at the time of its first use.

The authentication method according to the invention is also applied during the execution of an application by the mobile equipment, which allows to ensure, with the aid of the subscriber module, that this application is authorized to access certain resources (data or functions) contained in said subscriber module. In particular, the subscriber module can regularly verify the cryptogram attached to an application during the execution of said application.

For example, the insertion of a subscriber module of a user in another mobile equipment will influence the functioning of certain applications without preventing the establishment of classical telephone communications. This barrier acts as a filter that aims to eliminate unauthorized mobile equipment or simulation apparatuses or even applications originating from sources unapproved by the operator or a partner application supplier.

A modification of the application by a third party is also detected by the subscriber module that will refuse to execute certain commands received leading thus to the blocking or to limitation of the execution of the application.

The control server thus plays an essential role in managing the trust or security elements linked to the mobile equipment/subscriber module assembly. It interprets the data that is transmitted to it by the mobile equipment in order to control or limit the use of applications thanks to the resources (data or functions) stored in the subscriber module.

The server receiving the identity information from a mobile equipment and from its subscriber module and comprising the identifiers IMEISV and IMSI decides, according certain criteria, if a new instruction has to be sent to the subscriber module for redefining a new protection profile defining the resources of the subscriber module usable by the applications executed in the mobile equipment. The criteria can be referred, for example, to the update of software version installed in the mobile equipment, to the downloading of new application into the mobile equipment, to the updating period of the protection profile, to the number of connections to the network, to the technology used for the access to the network, to the identity of the used access network. They are also linked to different risks associated to the used hardware and software that the operator and/or the application supplier and/or the user desire to take into account.

The verification of the cryptogram can be carried out during the first initialization or at the time of the first use of an application or during each initialization of the latter. According to one variant, this verification can be carried out periodically at a given rate according to the instructions sent by the control server.

During the loading of an application in a mobile equipment, the attached cryptogram accompanying the application in general includes a digest of the application itself, that is to say a data block calculated from the application code with the aid of a mathematical unidirectional hash function.

When the subscriber module verifies the validity of the cryptogram, it also identifies indirectly the mobile equipment and ensures that the data come effectively from the control server. In other words, by means of this cryptogram, the control server implicitly ensures the subscriber module that the type and the software version of the mobile equipment has been taken into account, that the loading of the application has been controlled and that the application is authentic. According to instructions received previously, the subscriber module will decide whether to authorize or refuse the requests or commands coming from the application.

The mobile equipment plays a relay role in this verification step by establishing an almost direct dialogue between the subscriber module and the control server. Therefore, the security of the exchanged messages is assured from end to end between the control server and the subscriber module via the applications execution environment of the mobile equipment. The latter cannot therefore "cheat" or transform the data with respect to the subscriber module.

The present invention also concerns a security module comprising resources intended to be accessed locally by at least one application installed in an equipment connected to a network, said equipment comprising means for reading and transmission data comprising at least the identifier of the equipment and the identifier of the security module, said module is characterized in that it includes means for reception, storage and analysis of a cryptogram containing among other data, a digest of said application and instructions, as well as means for verification of said application, and means for extraction and execution of the instructions contained in the cryptogram releasing or blocking certain resources according to the result of the verification of the application.

This security module is used, for example, as a subscriber module or SIM card connected to a mobile equipment.

BRIEF DESCRIPTION OF THE DRAWINGS

The invention will be better understood thanks to the following detailed description that refers to the annexed figures given as a non-limitative example, namely:

FIG. 1b shows the verification process of the cryptogram according to the method of FIG. 1a.

FIG. 1c shows the process of the execution of the application using the resources of the subscriber module according to the method of FIG. 1a.

FIG. 2b shows the verification process wherein the application requests a cryptogram from the control server according to the method of FIG. 2a.

FIG. 2c shows the process of the execution of the application using the resources of the subscriber module according to the method of FIG. 2a.

FIG. 3b shows the verification process wherein the application requests a cryptogram and a digest of the application from the control server according to the method in FIG. 3a.

FIG. 3c shows the process of the execution of the application using the resources of the subscriber module according to the method in FIG. 3a.

DETAILED DESCRIPTION

The blocks schemes in FIGS. 1a, 1b, 1c, 2a, 2b, 2c, 3a, 3b, 3c show a mobile equipment assembly (CB) subscriber module (SIM) containing the resources (RES) connected via a mobile network (NET) to a control server (CSE) administrated by an operator. This server is connected to one or several application suppliers (FA).

The mobile equipment (CB) includes one or several software applications (APP) functioning in an execution environment (AEE). These applications originate, either from an application supplier (FA) associated to the control server (CSE) of the operator, or they can be programmed originally by the mobile equipment manufacturer. In the latter case, it is sometimes necessary to download updates that are also verified by the subscriber module (SIM).

Figure 1A:
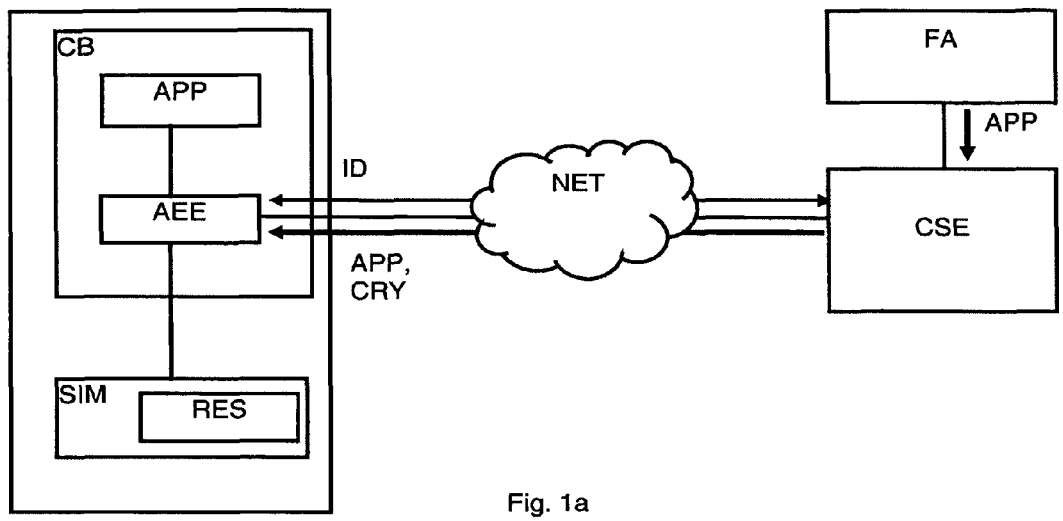
FIG. 1a shows a block schematic showing the installation process of an application according to a first embodiment in which the cryptogram is delivered via the application execution environment.
Figure 1B:
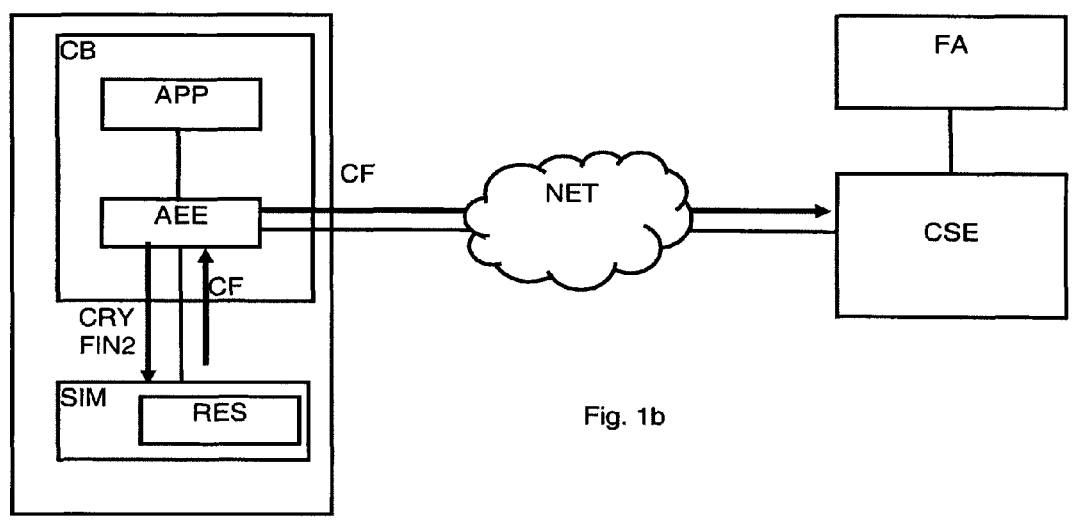
Figure 1C:
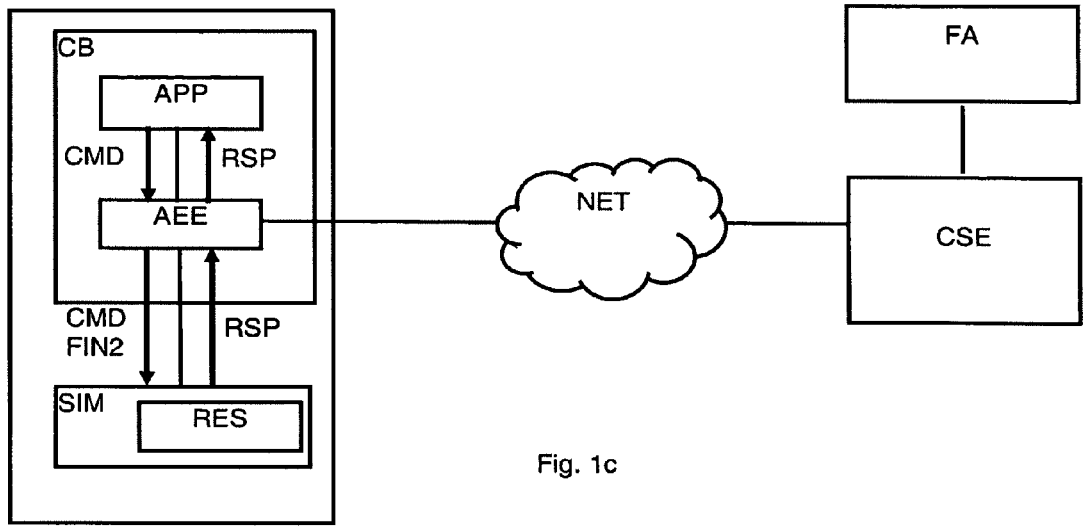

According to the first embodiment illustrated by FIGS. 1a, 1b, 1c, the cryptogram (CRY) of an application (APP) is delivered to the subscriber module (SIM) via the application execution environment (AEE) during the installation process of the application (APP).

FIG. 1a shows the installation process wherein the mobile equipment (CB) first transmits data serving as the identification (ID) of the subscriber module (SIM) that is verified by the control server (CSE). This identification (ID) is carried out from the identifier (IMSI) of the subscriber module (SIM) and the unique identifier (IMEISV) of the mobile equipment (CB). An application (APP) is then downloaded from the server (CSE) accompanied by a cryptogram (CRY) that will be transmitted towards the subscriber module (SIM) via the execution environment (AEE) for verification as shown in FIG. 1b.

It should be noted that the supplier (FA) is considered as trustworthy by the operator, that is to say that the applications (APP) are approved and function without causing any tort to the user and/or to the operator.

The method according to the invention is applied to several kinds of application (APP) executed in different execution environment types (AEE). For example, numerous mobile telephones have functions issued by Java applications that are executed by a Java virtual machine (VM) that serves as a processor and as an environment. The following description is based on the example of Java applications. Of course, other environments or operation systems such as Symbian OS, Windows, Palm OS, Linux etc. can be used as application support.

During execution, see FIG. 1c, a Java application requests the subscriber module (SIM), and informs the execution environment (AEE) by sending the requests or commands (CMD). The execution environment (AEE) calculates the digest (FIN2) of the application and sends it to the subscriber module (SIM). The cryptogram (CRY) that has been generated by the control server (CSE) and then loaded into the mobile equipment (CB) with the application (APP) (or separately) is stored in the subscriber module (SIM). The latter first verifies that it has effectively the necessary data allowing deciding if it must respond to the requests or controls (CMD) of the application (APP). This data that acts as rights loaded from the control server (CSE) during the loading of the application (APP), allows the control of the functioning of the application (APP). In the case of the absence of these rights, the application (APP) will not be able to use the resources (RES) (data or functions) of the subscriber module (SIM).

Figure 4:
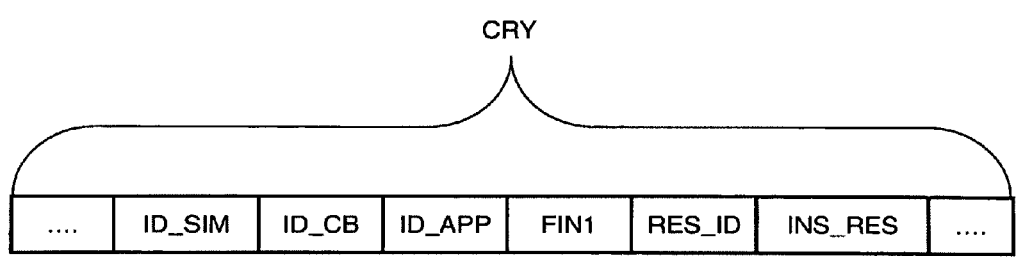
FIG. 4 shows the structure of an example of a cryptogram.

In the case that these rights are present, the subscriber module (SIM) verifies the digest (FIN1) issued by the cryptogram (CRY) stored by comparing it with the digest (FIN2) associated to the application (APP) and supplied by the application environment (AEE). This cryptogram (CRY) can be made in the form of a block encrypted by a private key of the type RSA (Rivest, Shamir, Adelman). This block represented by FIG. 4 contains for example, among other data, the identifier of the subscriber module IMSI (ID_SIM), the identifier of the mobile equipment IMEISV (ID_CB), an identifier of the application (ID_APP), the digest (FIN1) of the application, identifiers of SIM resources (RES_ID) and instructions for blocking/releasing SIM resources (INS_RES). This private key would only be known to the control server (CSE), whereas said key's public part would be known to the subscriber module (SIM). The advantage of the use of asymmetric keys lies in the fact that the key serving to create the cryptograms is not outside the control server (CSE).

Of course, other asymmetric key algorithms such as, for example, DSA (Digital Algorithm Signature), and ECC (Elliptic Curve Cryptography) can form alternatives to RSA The use of symmetrical key algorithms may be preferred for reasons regarding simplicity, rapidity of the verifications and lower manufacturing and implementation costs. In this case, the key would be known to the server (CSE) and to the subscriber module (SIM), for example, an algorithm IDEA (International Data Encryption Algorithm) could be used to sign the block (IMSI, IMEISV, application identifier, application digests, SIM resource identifiers, instructions for locking/releasing SIM resources). As an alternative to the algorithm IDEA, algorithms such as, for example, TDES (Triple Data Encryption Standard) and AES (Advanced Encryption Standard) can also be used.

In these two asymmetric and symmetrical key variants, the subscriber module (SIM) verifies the compliance of the different fields appearing in the cryptogram (CRY), in particular it controls the application identifiers (ID_APP) and the application digests (FIN1) that are authorized or prohibited to use its resources (RES) (data or functions).

In one variant, the cryptogram (CRY) can include a counter serving to prevent the double use of the same cryptogram intended for the subscriber module (SIM) (replay attack). In fact two applications of the same type can carry the same identifier and have the same digest (FIN1). In this case, the subscriber module (SIM) will also control the value of this counter by making a comparison with that of a reference counter that is stored and regularly updated.

A variant to the counter is the use of a random variable (random number) generated by the subscriber module (SIM). This random variable is transmitted with the data sent to the control server (CSE). The latter sends back this random variable in the response message and the subscriber module can verify that it concerns a new message. More generally, in order to avoid all risk of the use of an old cryptogram (CRY), the latter includes a variable that can be predicted by the subscriber module (SIM), let be a counter or a random variable.

In another variant the cryptogram (CRY) generated with the aid of a key of the RSA or IDEA type can be replaced by a block generated with a shared key HMAC (Keyed-Hashing for Message Authentication) from the set (IMSI, IMEISV, application identifier, application digest, SIM resource identifiers, instructions for locking/release of SIM resources). HMAC is a mechanism for messages authentication using cryptographic hash functions such as MD5 (Message Digest) or SHA-1 (Secure Hash Algorithm), in combination with a shared key.

This key that is present both in the control server (CSE) and in the subscriber module (SIM) can be loaded at the time of the personalization of the subscriber module (SIM) or at the time of the installation of certain resources (RES) in the subscriber module of (SIM). According to the options, each resource (RES) or resource group of the subscriber module (SIM) can be associated to a different key, or, the key can be global for all the resources (RES) and unique for a given subscriber module (SIM).

Therefore, the cryptogram (CRY) allows the subscriber module (SIM) to know the resource(s) (RES) that can be released or blocked in the subscriber module (SIM) for the corresponding mobile equipment (CB).

The two digests used (FIN1, respectively FIN2) are determining elements since they constitute the cryptographic control means of the application (APP) by means of the mobile equipment (CB) and the subscriber module of (SIM). This type of control is necessary in order to prevent a third application from carrying out authentication with a given cryptogram (CRY). In fact, if the cryptogram A authenticates the application A from subscriber module A in a mobile equipment A, it becomes necessary to avoid the situation in which another application B is unduly authenticated with this same cryptogram A from subscriber module A in the mobile equipment A.

According to one variant, the application digest (FIN1) included in the cryptogram (CRY) remains confidential from end to end between the control server (CSE) and the subscriber module (SIM). For this, the digest (FIN1) is encrypted by the control server (CSE) and decrypted by the subscriber module (SIM). Furthermore, the application (APP) can be personalized for a given loading in such a way that the digest (FIN1) included in the cryptogram (CRY) and the digest (FIN2) of the application (APP) calculated by the execution environment (AEE) remain identical but depend on the identity of the mobile equipment (CB). This type of measure is necessary if the situation is to be prevented in which a third application is authenticated with an digest given in another application execution environment (AEE) whose interface with the subscriber module (SIM) could be compromised. In fact, if the digest A authenticates the application A from the subscriber module A in mobile equipment A, it is necessary to avoid another application B from unduly authenticating with this same digest A from the subscriber module B in mobile equipment B.

According to another variant, each application (Java type) is accompanied by two cryptograms: a Java cryptogram intended for the virtual machine (VM) and a cryptogram (CRY) intended for the subscriber module (SIM). These two cryptograms comprise among others the same application digest (here called FIN2) which is that of the code of the Java application. Therefore, when the subscriber module (SIM) must verify the cryptogram (CRY) of an application, it awaits from the virtual machine (VM) the digest (FIN2) associated to the application (APP) in question that it will have necessarily calculated previously. The application digest is transmitted by the mobile equipment (CB) to the subscriber module (SIM). This digest does not come from the control server, it is calculated by the application execution environment (AEE) of the mobile equipment (CB) after the downloading of the application (APP). On the other hand, the mobile equipment (CB) transmits the cryptogram (CRY) loaded previously in addition with the application from the control server to the subscriber module. Therefore, the latter can verify the digest received by making a comparison. The mobile equipment (CB) cannot cheat as it does not know the digest to be received by the subscriber module (SIM); if it is the case, it may be necessary to render the function of digest calculation, usually a hash function, reversible or to find another digest giving the same cryptogram (CRY) which is almost impossible.

FIG. 1b shows the verification process of the cryptogram (CRY) that can be carried out either regularly, for example, before each request of the application (APP) concerned, or preferably, once before its installation or before its first use. If the cryptogram (CRY) is valid, the subscriber module (SIM) transmits an acceptance message (OK) to the execution environment (AEE). The application (APP) can then address its requests or commands (CMD) to the subscriber module (SIM) via the execution environment (AEE) and use the resources (RES) of the subscriber module (SIM). This latter accepts the commands (CMD) by transmitting the responses (RSP) that are adequate to the application (APP) via the execution environment (AEE), see FIG. 1c.

In the case of an invalid cryptogram (CRY), the subscriber module (SIM) transmits a refusal message (NOK) to the execution environment (AEE). In such a case the execution environment (AEE) can either annul the application installation process (APP), or the application (APP) is installed and its requests or commands (CMD) addressed to the subscriber module (SIM) via the execution environment (AEE) will remain without response (RSP) and the resources (RES) of the subscriber module (SIM) will not be available for use.

In both cases of acceptance and refusal (OK and NOK) the application execution environment (AEE) can relay the response to the control server (CSE). The subscriber module can thus indirectly send back a confirmation (CF) of reception of the cryptogram (CRY) to the control server (CSE) and allow the end-to-end control of the operation, see FIG. 1b. The confirmation (CF) includes at least one success or error code of the operation as well as a counter serving to protect against a repetition attack. This message also allows the control server (CSE) to maintain updated the counter associated with the subscriber module (SIM).

Figure 2A:
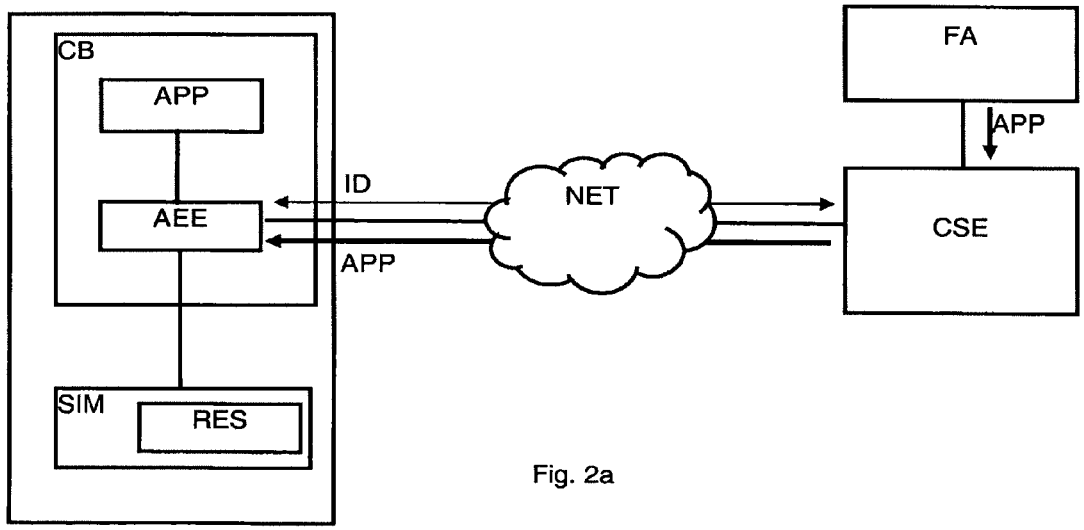
FIG. 2a shows a block schematic showing the installation process of an application according to a second method wherein only the application is downloaded.
Figure 2B:
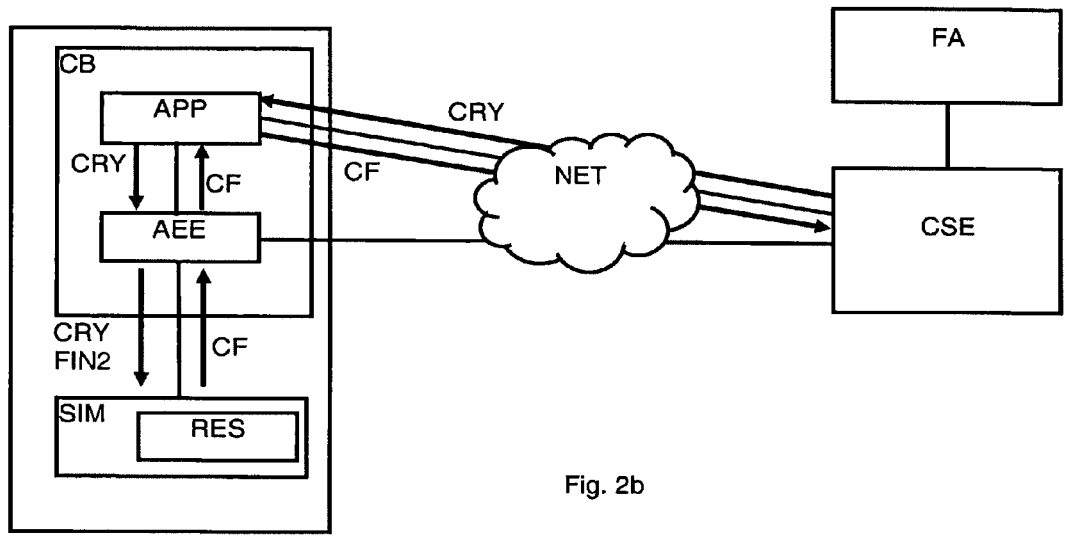
Figure 2C:
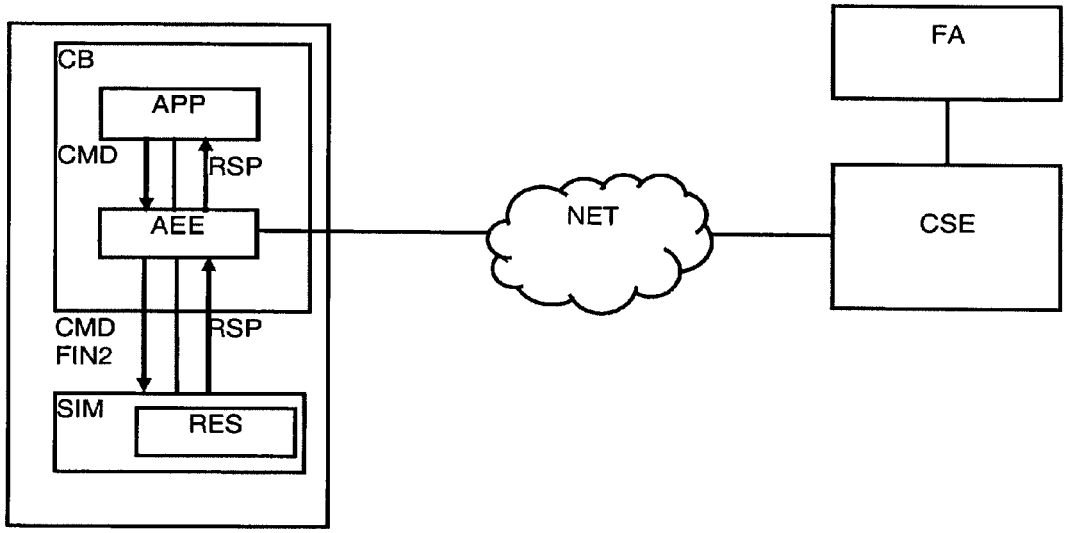

According to the second embodiment illustrated by FIGS. 2a, 2b, 2c, the application (APP) is only downloaded, after the identification (ID) of the mobile equipment (CB), without cryptogram (CRY), see FIG. 2a.

During the verification process, FIG. 2b, the application (APP) requests, at the time of its initialization by the user, a cryptogram (CRY) comprising the resource usage rights (RES) for said application. This cryptogram (CRY) is downloaded, from the control server (CSE), directly by the application (APP) that transmits it to the subscriber module (SIM) via the execution environment (AEE). The subscriber module (SIM) transmits a confirmation (CF) of the reception of the cryptogram (CRY) to the server (CSE), by means of the application (APP) and not by means of the execution environment (AEE) as is the case in the first embodiment. In this way, the execution environment (AEE) plays only the role of a relay between the application (APP) and the subscriber module (SIM).

The execution process of the application (APP) after the verification of the cryptogram (CRY), see FIG. 2c, takes place in the same way as in the first method illustrated in FIG. 1c described above.

Figure 3A:
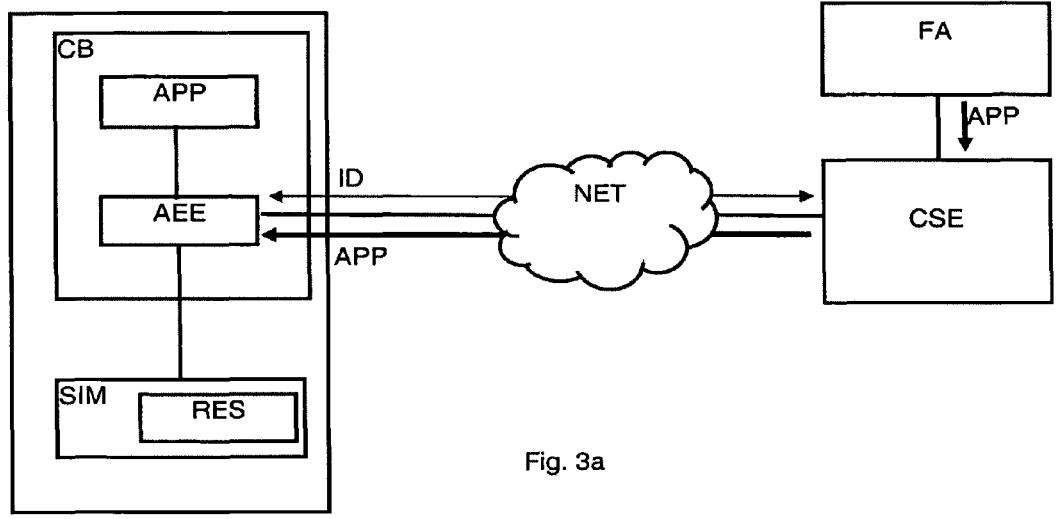
FIG. 3a shows a block schematic showing the installation process of an application according to a third method wherein only the application is downloaded.
Figure 3B:
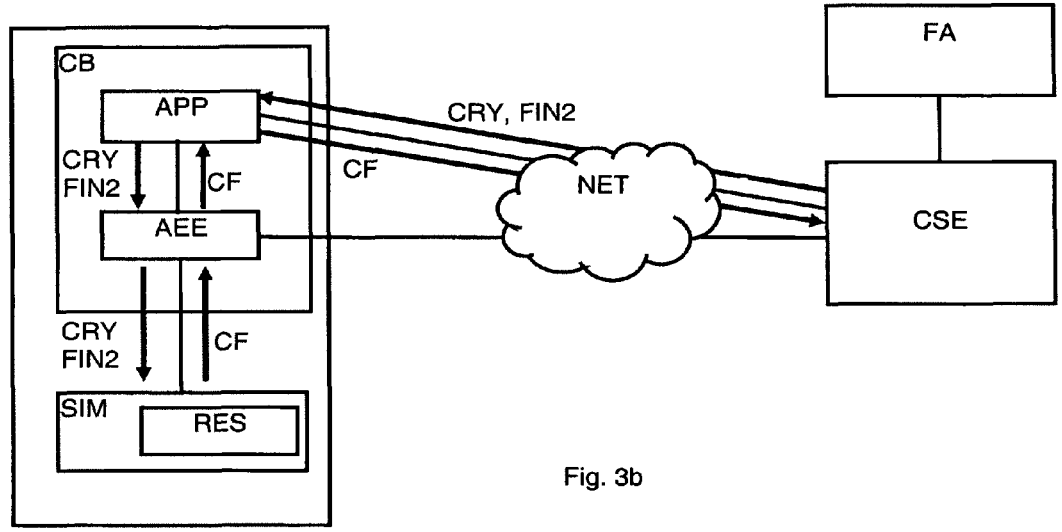
Figure 3C:
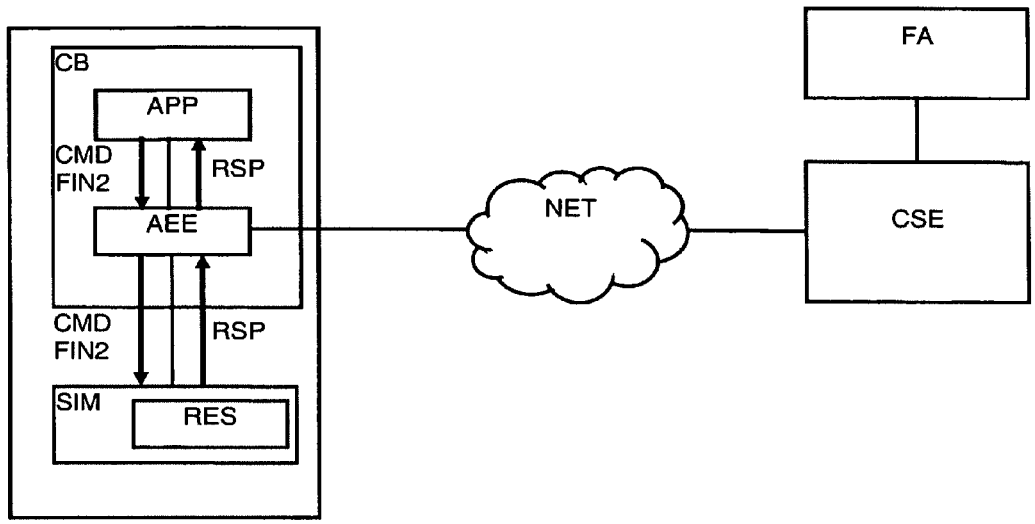

The FIGS. 3a, 3b, 3c show a third variant where the application APP is only downloaded, after identification (ID) of the mobile equipment (CB), from the control server (CSE) or from an intermediate application downloading server (APP) see FIG. 3a. At the time of the verification process (FIG. 3b), the application loads the cryptogram (CRY) and the digest (FIN2) directly from the server (CSE) or from an intermediate application downloading server (APP). In this case, unlike in the two previous variants, the application environment (AEE) no longer calculates the digest (FIN2) that is calculated by an external unit, either by the control server CSE, or by an intermediate application downloading server (APP).

The application execution process (APP) after verification of the cryptogram (CRY), see FIG. 3c, takes place in the same way as in the two previous methods illustrated in FIGS. 1c and 2c.

This third embodiment may be preferred as its advantage lies in the fact that it does not require any modification of the execution environment (AEE) as it is presently defined for Java applications installed in the mobile telephones, that is to say that a modification of the existing standards is unnecessary.

Furthermore, the constraint of the first variant that requires two cryptograms using the same digest disappears given that the verification processes of the cryptogram (CRY) and that of the installation of the application are totally independent.

In order to personalize the digests calculated on the applications, a possibility consists in adding to the application code, before being loaded into the mobile equipment, a different data for each item of mobile equipment. Therefore, when the digest is calculated by the application environment of the mobile equipment, this digest is unique and cannot be used for another mobile equipment. The cryptogram, of course, will be calculated by the control server on the basis of the original data of the application and on this unique data.

In one variant of the invention, the mobile equipment can be replaced by a stationary apparatus such as a Pay-TV decoder or a computer. Applications can be downloaded in the apparatus from a server via a telecommunications network. A cryptogram associated to the application is stored in the security module and verified during implementation or at the time of each application initialization. The result of this verification conditions the functioning of the application by releasing or blocking the resources in the security module.

The invention claimed is:

1. An authentication method of at least one application working in a Pay-TV decoder connected by a network to a control server, said Pay-TV decoder being locally connected to a security module, said application being at least one of loadable and executable via an application execution environment of the Pay-TV decoder and the at least one application being configured to use resources stored in the security module, the method comprising:

receiving by the control server, via the network, identification data including at least an identifier of the Pay-TV decoder and an identifier of the security module;

analyzing and verifying, by the control server, said identification data and, based on the analysis and verification, the control server creating a protection profile defining resources of the security module that can be used by the at least one application, the protection profile being created based on at least one of, an updating of a version of a software installed in the Pay-TV decoder, a downloading of a new application in the Pay-TV decoder, an updating period of the protection profile, a number of connection of the Pay-TV decoder to the network, and a technology used for accessing the network;

generating, by the control server, a cryptogram, the cryptogram including a digest of the at least one application, the identification data, the protection profile and at least one of an identifier of the at least one application and an identifier of security module resources; and transmitting the at least one application and the cryptogram by the control server, via the network and the Pay-TV decoder, to the security module, wherein, when the at least one application and cryptogram are transmitted at a same time, the method includes, verifying, by the security module, the at least one application by comparing the digest extracted from the received cryptogram with a digest determined by the security module, the verification occurring periodically at a rate given by the control server, during at least one of a first initialization of the at least one application, a first use of the at least one application, and each initialization of the at least one application, the security module performs at least one of releasing and blocking access of certain resources of said security module to the at least one application based on the received protection profile, and when the at least one application and the cryptogram are not transmitted at a same time, the method includes, requesting by the at least one application, once loaded into the Pay-TV decoder from the control server via the network, the cryptogram from the server at the time of an initialization of the at least one application and transmitting the cryptogram to the security module, a confirmation message of acceptance or refusal of the cryptogram being transmitted by the security module to the server via the at least one application; and performing the verifying by the security module when the cryptogram is accepted.

2. The method according to claim 1, wherein the identification data of at least one of-the Pay-TV decoder and security module includes an identifier of the Pay-TV decoder and an identifier of the security module pertaining to a Pay-TV subscriber.

3. The method according to claim 1, wherein the protection profile received by the security module condition the use of the at least one application according to criteria established previously by at least one of the Pay-TV operator, the application supplier and the user of Pay-TV decoder.

4. The method according to claim 3, wherein the criteria define limits of use of the at least one application according to risks associated with at least one of the software of the at least one application and the hardware of the Pay-TV decoder that the Pay-TV operator desires to take into account.

5. The method according to claim 1, wherein the cryptogram is generated with the aid of an asymmetrical or symmetrical encryption key from a data set including the identifier of the Pay-TV decoder, the identifier of the security module, an identifier of the at least one application, the digest of the at least one application calculated with an unidirectional hash function, identifiers of the resources of the security module and the protection profile.

6. The method according to claim 5, wherein the cryptogram includes a variable that is predictable by the security module thereby avoiding the double use of a same cryptogram, the value of said variable controlled by the security module by comparing the value of the variable with a reference value, the reference value being stored in the security module and regularly updated.

7. The method according to the claim 1, wherein the cryptogram is transmitted to the security module at the same time as the at least one application is loaded into the Pay-TV decoder via the application execution environment.

8. A system, comprising:

a security module including resources that are accessed locally by at least one application installed in a Pay-TV decoder, the Pay-TV decoder being connected by a network to a control server, wherein the Pay-TV decoder is configured to read and transmit data, the transmitted data including at least one of an identifier of the Pay-TV decoder and an identifier of the security module, wherein the security module is configured to receive, store and analyze a cryptogram and the at least one application received with the cryptogram, the cryptogram and the at least one application being transmitted by the control server, wherein the control server is configured to analyze and verify the transmitted at least one of the identifier of the Pay-TV decoder and the identifier of the security module, and the control server is configured to create a protection profile defining resources of the security module that can be used by the at least one application, the protection profile being created based on at least one of, an updating of a version of a software installed in the Pay-TV decoder, a downloading of a new application in the Pay-TV decoder, an updating period of the protection profile, a number of connection of the Pay-TV decoder to the network, and a technology used for accessing the network, wherein the cryptogram includes a digest of the at least one application, at least one of the identifier of the Pay-TV decoder and the identifier of the security module, the protection profile, information for verifying said at least one application, and information for identification of security module resources, wherein the security module is further configured to perform extraction and execution, wherein the system is configured such that, when the at least one application and cryptogram are received at a same time, the security module performs the extraction and execution by performing at least one of releasing and blocking certain resources of the security module to the at least one application according to the received protection profile, and verifying the at least one application, the verification occurring periodically at a rate given by the control server, during at least one of a first initialization of the at least one application, a first use of the at least one application, and each initialization of the at least one application, and wherein the system is configured such that, when the at least one application and the cryptogram are not received at a same time, the at least one application, once loaded into the Pay-TV decoder from the control server via the network, requests the cryptogram from the server at the time of its initialization and transmits the cryptogram to the security module, the confirmation message of acceptance or refusal of the cryptogram being transmitted by the security module to the server via the at least one application, and wherein the security module is configured such that performing the extraction and execution includes performing at least one of releasing and blocking certain resources of the security module to the at least one application according to the received protection profile, and verifying the at least one application, the verification occurring periodically at a rate given by the control server, during at least one of a first initialization of the at least one application, a first use of the at least one application, and each initialization of the at least one application.

* * * * *